(12) United States Patent
Chihara et al.

(10) Patent No.: US 7,021,873 B2
(45) Date of Patent: Apr. 4, 2006

(54) RADIUS END MILL AND MANUFACTURING METHOD OF BEVEL GEAR FORGING DIE

(75) Inventors: Seiji Chihara, Aichi-ken (JP);
Syoichiro Udou, Toyota (JP)

(73) Assignee: Toyota Jidosha Kabushiki Kaisha, (JP)

( * ) Notice: Subject to any disclaimer, the term of this patent is extended or adjusted under 35 U.S.C. 154(b) by 0 days.

(21) Appl. No.: 10/465,868

(22) Filed: Jun. 20, 2003

(65) Prior Publication Data

US 2003/0235479 A1    Dec. 25, 2003

(30) Foreign Application Priority Data

| Jun. 21, 2002 | (JP) | ............................. 2002-182247 |
| May 28, 2003 | (JP) | ............................. 2003-150944 |

(51) Int. Cl.
*B23C 1/00* (2006.01)
(52) U.S. Cl. ..................... 409/132; 409/131; 407/53; 407/54
(58) Field of Classification Search ................ 409/131, 409/132; 407/53, 54; 76/107.1
See application file for complete search history.

(56) References Cited

U.S. PATENT DOCUMENTS

| 4,104,943 | A | * | 8/1978 | Calderoni | .................... 409/191 |
| 4,560,308 | A | * | 12/1985 | Deller | .......................... 407/53 |
| 4,712,948 | A | * | 12/1987 | Kidani | ......................... 407/42 |
| 5,090,851 | A | | 2/1992 | White | |
| 5,378,091 | A | * | 1/1995 | Nakamura | ................... 409/132 |
| 5,779,399 | A | * | 7/1998 | Kuberski | ..................... 407/54 |
| 6,152,657 | A | * | 11/2000 | Packer et al. | ................... 407/32 |
| 6,158,304 | A | * | 12/2000 | Packer et al. | ............... 76/104.1 |
| 6,439,811 | B1 | * | 8/2002 | Wardell | ........................ 407/54 |
| 6,655,880 | B1 | * | 12/2003 | MacArthur | ................... 407/53 |
| 2002/0148316 | A1 | * | 10/2002 | Takano et al. | ............. 74/459.5 |

FOREIGN PATENT DOCUMENTS

| EP | 0 934 788 A1 | 8/1999 |
| EP | 0 579 371 B1 | 9/1999 |
| JP | 7-246508 | 9/1995 |
| JP | 07246508 A * | 9/1995 |
| JP | 10-230407 | 9/1998 |
| JP | 11-070405 | 3/1999 |
| JP | 11-216609 | 8/1999 |

(Continued)

OTHER PUBLICATIONS

Japanese Office Action dated Aug. 2, 2005.

*Primary Examiner*—Boyer D. Ashley
*Assistant Examiner*—Dana Ross
(74) *Attorney, Agent, or Firm*—Finnegan, Henderson, Farabow, Garrett & Dunner, L.L.P.

(57) ABSTRACT

A technique having superior efficiency for manufacturing a bevel gear forging die is presented. In the present invention, raw material is machined by means of a radius end mill, manufacturing a bevel gear forging die 10. In recent years, it has become possible to use radius end mills to form complex shapes from raw materials having a high degree of hardness, owing to the fact that NC construction devices and their controlling programs control the deployment of radius end mills, and due to the improved accuracy of the radius end mill itself. By improving the process path of the radius end mill, the inventors have succeeded in creating a process whereby a radius end mill can be used to cut a bevel gear forging die 10 having a side face, a base face, and a diagonal face.

8 Claims, 13 Drawing Sheets

FOREIGN PATENT DOCUMENTS

| | | |
|---|---|---|
| JP | 11-249722 | 9/1999 |
| JP | 2000-000716 | 1/2000 |
| JP | 2000-024838 | 1/2000 |
| JP | 2000005915 A * | 1/2000 |
| JP | 2000-214909 | 8/2000 |
| JP | 2000-263179 | 9/2000 |
| JP | 2000-263308 | 9/2000 |
| JP | 2000-28827 | 10/2000 |
| JP | 2001-71209 | 3/2001 |
| JP | 2001-198730 | 7/2001 |
| JP | 2001-205385 | 7/2001 |
| JP | 2002-021979 | 1/2002 |
| JP | 2002-46030 | 2/2002 |
| JP | 2002239676 A * | 8/2002 |

* cited by examiner

RADIUS END MILL AND MANUFACTURING METHOD OF BEVEL GEAR FORGING DIE

CROSS-REFERENCE

This application claims priority to Japanese patent application serial numbers 2002-182247 and 2003-150944, the contents of which are hereby incorporated by reference as if fully set forth herein.

BACKGROUND OF THE INVENTION

1. Field of the Invention

The present invention relates to a technique for manufacturing a bevel gear forging die. In particular, the present invention relates to a technique for manufacturing the bevel gear forging die efficiently by using a radius end mill.

2. Description of the Related Art

Materials with a high degree of hardness are used in a forging die (mold) for forging a bevel gear in order to prolong the life of the forging die. For this reason, a discharge process, which is suitable for processing materials with a high degree of hardness, is used to manufacture the forging die. Japanese Laid Open Patent Publication 2000-24838 teaches a technique to manufacture a bevel gear forging die by using a discharge process.

SUMMARY OF THE INVENTION

However, because of the characteristics of the discharge process, it is a time-consuming process to manufacture a bevel gear forging die by using a discharge process. Moreover, effort is expended in adjusting a gap between a discharge electrode and a work. For these reasons, manufacturing efficiency is low.

The present invention resolves the above problems by presenting a highly efficient technique for manufacturing a bevel gear forging die.

In the present invention, a bevel gear forging die is produced by cutting raw material with using a radius end mill. The radius end mill in the present invention refers to a tool of a kind of end mills in which cutting blades extend in a screw shape about an axis of the tool (hereafter referred to as side cutting blades), at the end of the tool, the cutting blades change direction so as to extend from the side cutting blades toward the axis of the tool (hereafter the cutting blades extending toward the axis are referred to as end cutting blades), and the side cutting blades and the end cutting blades are connected by R-shaped (i.e., extending in an arc shape) cutting blades (hereafter referred to as R-shaped cutting blades). The radius end mill comprises the side cutting blades (extending in a screw shape), the end cutting blades (extending toward the tool axis) and the R-shaped cutting blades (extending in an arc shape and connecting the side cutting blades and the end cutting blades).

The side cutting blades of the radius end mill serve to machine a side face in steps and grooves, and the end cutting blades serve to machine a bottom face in steps and grooves. By providing the R-shaped cutting blade between the two, an R-shape (rounded shape) can be formed between the side face and the bottom face. The radius end mill is used for machining the side face by using the side cutting blades, machining the bottom face by using the end cutting blades, or machining both the side face and the bottom face simultaneously by using the side cutting blades and the end cutting blades. If used in this last manner, the R-shape between the side face and the bottom face can be formed simultaneously.

In recent years, it has become possible to use radius end mills to form complex shapes by cutting raw materials having a high degree of hardness, due to the fact that NC (numerical control) machine and their programs for controlling the deployment of radius end mills by the NC machine have been improved, and due to the improved accuracy of the radius end mill itself.

However, radius end mills have been limited in their use to machining a side face, a bottom face, or side and bottom faces, and have not been used for forming a diagonal face present in bevel gears or the like. When a diagonal face has to be machined, a bowl end mill, which has been developed for this purpose, has been used; and a radius end mill has not been used.

The bevel gear forging die has a side face, a bottom face, and a diagonal face, and requires the machining of an R-shape at the meeting point of the faces. Since machining a diagonal face is necessary, a bowl end mill has been used for this purpose; however, the bowl end mill cannot satisfactorily machine a side face and a bottom face. Until now, it has been assumed that a radius end mill cannot be used in manufacturing the bevel gear forging die, because it is necessary to machine a diagonal face. Conventionally, since there is no appropriate tool to machine hard raw materials to produce the bevel gear forging die having a side face, a bottom face, and a diagonal face, a discharge process has been used.

By improving the deployment path of the radius end mill, the inventors have succeeded in creating a process whereby a radius end mill can be used to cut a bevel gear forging die having a side face, a bottom face, and a diagonal face. If the radius end mill is used, the machining can be completed in a short period of time, and compared to the discharge process, the processing time can be greatly decreased. Since the present invention was successful in using the radius end mill to manufacture the bevel gear forging die, the manufacturing efficiency of the bevel gear forging die has been greatly improved.

It is desirable that a method for manufacturing a bevel gear forging die comprises a step in which side cutting blades of a radius end mill machine raw material and thereby form an inner side face of the bevel gear forging die, a step in which end cutting blades of the radius end mill machine raw material and thereby form an inner bottom face of the bevel gear forging die, and a step in which side cutting blades and R-shaped cutting blades of the radius end mill machine raw material and thereby form an inner diagonal face of the bevel gear forging die.

If the bevel gear forging die is manufactured by combining the steps of forming the inner side face by means of the side cutting blades, forming the inner bottom face by means of the end cutting blades, and forming the inner diagonal face by means of the side cutting blades and the R-shaped cutting blades, the machining process can be performed with only the radius end mill, and the bevel gear forging die can be produced in a short period of time. In particular, if the diagonal face is machined using the side cutting blades and the R-shaped cutting blades, the time required for machining is greatly reduced.

When the bevel gear forging die is manufactured by machining raw material using the radius end mill, it is desirable to include a machining step in which the radius end mill is moved in a direction diagonal with respect to its axis.

By this means, the diagonal face can be machined using the radius end mill. Diagonal deployment of the radius end mill has not been used for machining and the diagonal face has not been formed by the radius end mill.

When the bevel gear forging die is manufactured by machining raw material using the radius end mill, it is even more desirable to include a machining step in which the radius end mill is moved diagonally in a reward direction. If the radius end mill is moved diagonally in a forward direction, the end cutting blades contact the work at first and later the side cutting blades contact the work. If the radius end mill is moved diagonally in a reward direction, the side cutting blades contact the work at first and later the end cutting blades contact the work. Forward movement may be called push cutting, and reward movement may be called pull cutting. The inventors found that the efficiency of pull cutting is much higher than push cutting.

When the radius end mill is moved diagonally in reward direction, the side cutting blades of the radius end mill can machine the material. The side cutting blades of the radius end mill have a greater machining ability than the end cutting blades. For this reason, the bevel gear forging die can be manufactured with greater efficiency by using diagonal pull cutting.

When the bevel gear forging die is manufactured by machining raw material using the radius end mill, it is also desirable to use a radius end mill having an R-shaped cutting blade whose radius corresponds to the minimum radius of the R-shape to be formed in the corner where the faces of the bevel gear forging die meet.

When the bevel gear forging die is manufactured using a radius end mill having an R-shaped cutting blade whose radius corresponds to the minimum radius of an R-shape to be formed in the corner where the faces of the bevel gear forging die meet, it is no longer necessary to use another tool (for example, a bowl end mill) to process the R-shape. Consequently, the machining process can be continued with the same tool, resulting in high operability.

When the bevel gear forging die is manufactured by machining raw material using the radius end mill, it is desirable that a radius end mill in which at least portion of the end cutting blade extends along a direction perpendicular to the axis of the radius end mill is used.

When at least a portion of the end cutting blade extends along a direction perpendicular to the axis of the radius end mill, the portion of the end cutting blade forms a plane face at the cutting surface of the raw material, this plane face being in a direction perpendicular to the axial direction. For this reason, the end cutting blades level out the cutting surface while performing machining, thereby suppressing traces of processing.

It is desirable that the radius end mill has an R-shaped cutting blade whose radius corresponds to the minimum radius of the R-shape to be formed at the corner where the faces of the bevel gear forging die meet.

If the bevel gear forging die is manufactured using such a radius end mill, there is no need to use a different tool for processing the R-shape.

It is also desirable that, in the radius end mill to be used for machining the bevel gear forging die, at least a portion of the end cutting blade is formed along a direction perpendicular to the axial direction.

By using such a radius end mill, traces of processing can be suppressed.

DETAILED DESCRIPTION OF THE PREFERRED EMBODIMENTS

Figure 1:
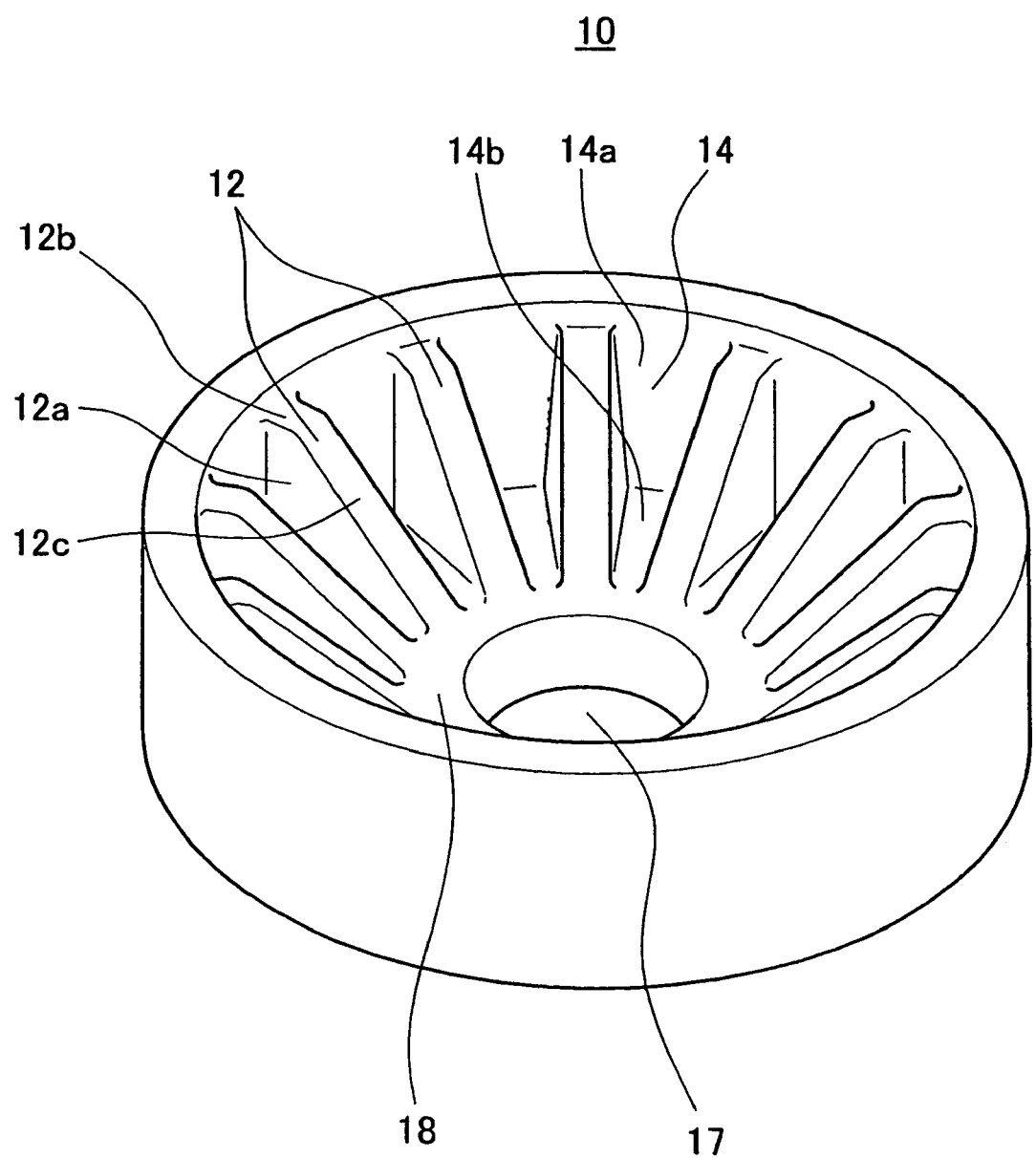
FIG. 1 shows a diagonal view of a bevel gear forging die of the present embodiment.

A manufacturing process for a bevel gear forging die relating to an embodiment of the present invention is described next with reference to diagrams. First, a completed bevel gear forging die 10 is described while referring to FIG. 1 (hereafter, the up-down direction of FIG. 1 will be referred to as the up-down direction of the bevel gear forging die 10). As shown in FIG. 1, the bevel gear forging die 10 comprises a plurality of tooth molds 12, for forming tooth grooves at the bevel gear, located in a spoke shape, and tooth grooves 14, for forming teeth at the bevel gear, formed between the tooth molds 12. Each of the tooth molds 12 has a tooth mold side face (tooth face) 12*a*, a tooth mold upper face 12*b*, and a tooth mold face (tooth base) 12*c*. Each of the tooth grooves 14 has a tooth groove anterior face (large diameter) 14*a* and a tooth groove bottom face (tooth end) 14*b*. The base portion of the bevel gear forging die 10 has a bottom face 18 surrounded by the tooth molds 12 and the tooth grooves 14. The central portion of the bottom face 18 has a circular opening 17 formed therein.

The bevel gear forging die 10 is formed by machining a raw material by means of a radius end mill. Here, the term "radius end mill" refers to an end mill in which side cutting blades and end cutting blades are connected by R-shaped (arc-shaped) cutting blades. The side cutting blades extend in a screw shape about the axis of the tool, and the end cutting blades extend from the outer edge of the tool toward the axis of the tool along the forward end face of the tool.

Figure 2:
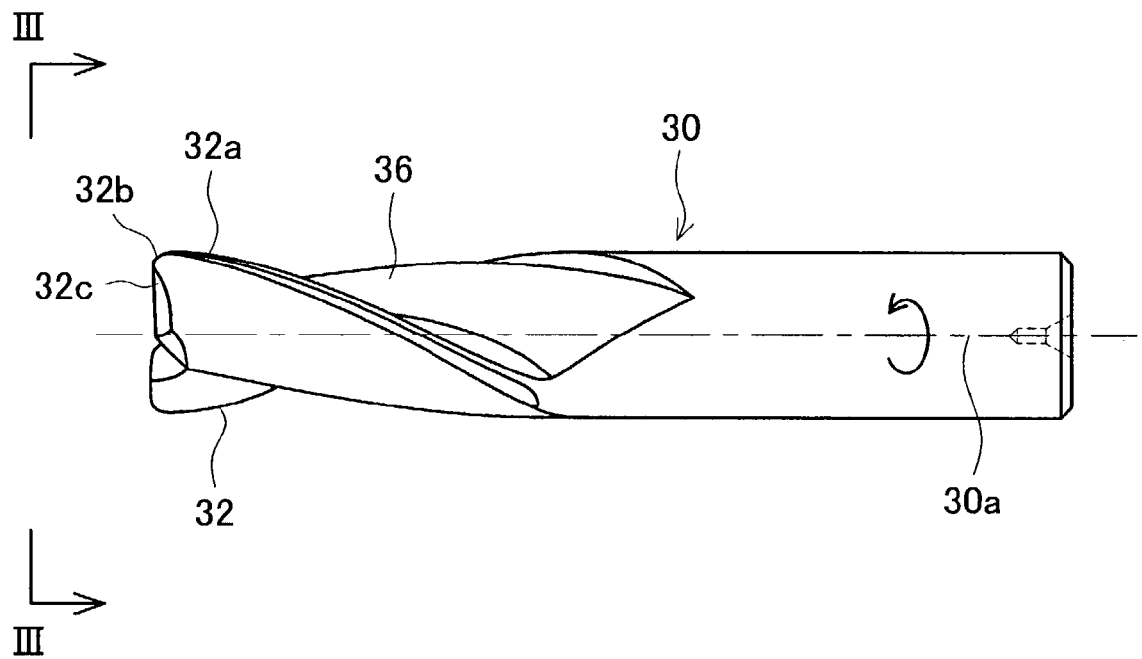
FIG. 2 shows a side view of a radius end mill of the present embodiment.
Figure 3:
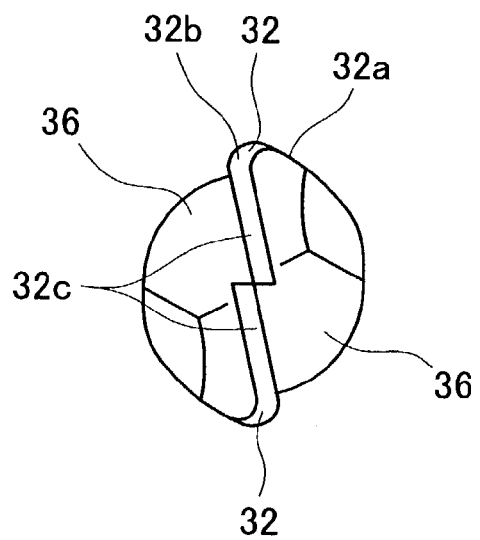
FIG. 3 shows a view along the line III—III of FIG. 2.

FIGS. 2 and 3 show an example of a radius end mill 30 having two blades. A cutting blade 32 of the radius end mill 30 comprises a side cutting blade 32*a*, an R-shaped cutting blade 32*b* connected to the side cutting blade 32*a*, and an end cutting blade 32*c* extending from the R-shaped cutting blade 32*b* toward an axis 30*a* of the tool 30. The cutting blade 32 has a chip disposal groove 36 provided thereon, this chip disposal groove 36 extending along the direction of the axis 30*a*. The radius end mill 30 is connected to an NC machine (not shown) and, while rotating along the axis 30*a*, performs machining of material either in a direction perpendicular to or along the axial direction (depending on how it is deployed).

Figure 4:
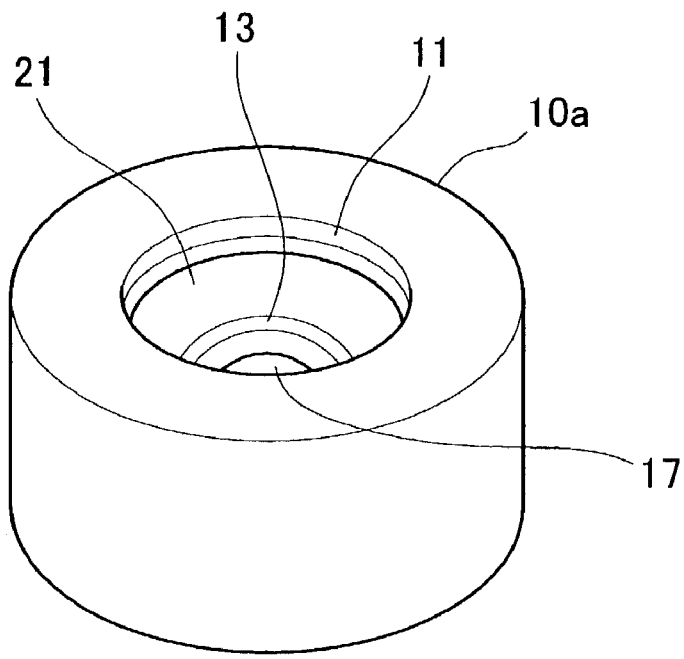
FIG. 4 shows a diagonal view of an intermediate material of the present embodiment.
Figure 5:
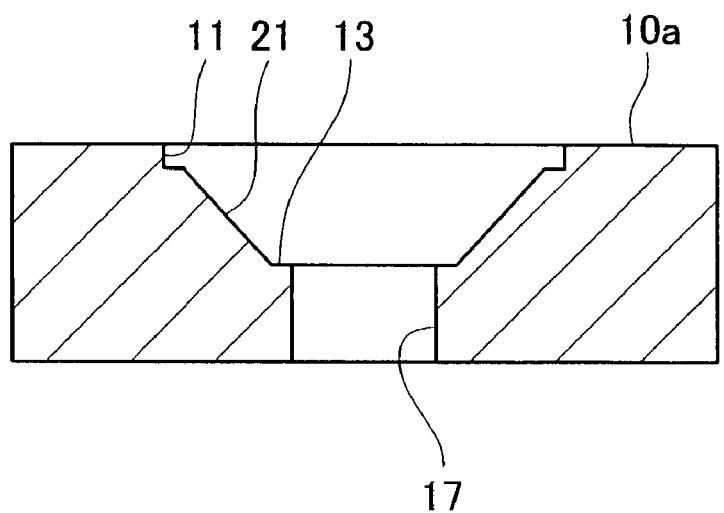
FIG. 5 shows a cross-sectional view of the intermediate material of the present embodiment.

The bevel gear forging die 10 is processed from an intermediate material 10*a* shown in FIGS. 4 and 5. The intermediate material 10*a* is material that has been forge molded and has a high degree of hardness. The intermediate material 10*a* has a stepped portion 11 formed on its upper portion. Connected to the stepped portion 11 is a concave cone shaped member 21, and at a lower end of the concave cone shaped member 21 is a horizontal bottom face 13 that is connected to the concave cone shaped member 21. The central portion of the bottom face 13 has an opening 17 formed therein.

Figure 6:
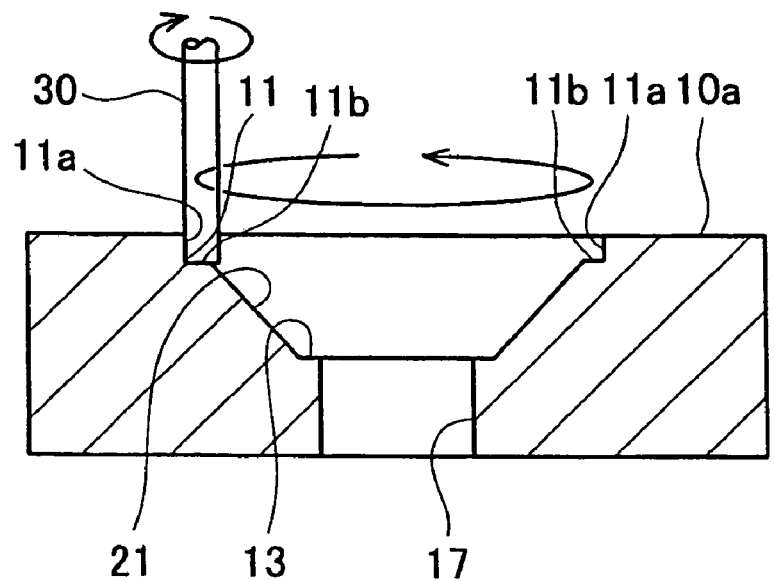
FIG. 6 shows a cross-sectional view of stepped portions of the intermediate material of the present embodiment in a state of being processed.

As shown in FIG. 6, when the bevel gear forging die 10 is to be processed, the radius end mill 30 is first deployed along the circumference direction of the intermediate material 10*a*, this performing rough processing on a side face 11*a* and lower end face 11*b* of the stepped portion 11. During this processing, each time the radius end mill 30 rotates once in the circumference direction, it is deployed slightly toward the side face 11*a* and the lower end face 11*b*. Accordingly, with each rotation of the radius end mill 30, the side face 11*a* and the lower end face 11*b* are gradually machined. Here, the term rough processing refers to a machining process whereby, prior to the final processing, a single round of processing results in as large a cut as possible.

Figure 7:
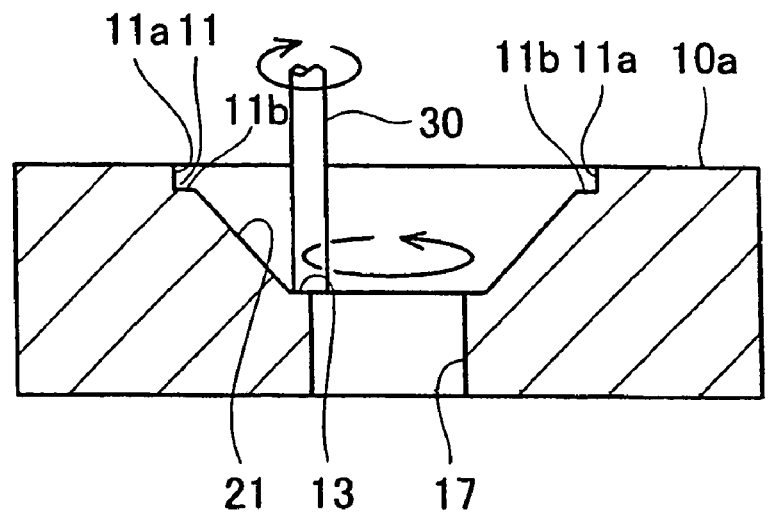
FIG. 7 shows a cross-sectional view of a bottom face of the intermediate material of the present embodiment in a state of being processed.

Next, as shown in FIG. 7, rough processing is performed on the bottom face 13 by deploying the radius end mill 30 in the circumference direction of the intermediate material 10*a*. Each time the radius end mill 30 rotates once in the circumference direction, it is deployed slightly toward the bottom face 13. Accordingly, the bottom face 13 is gradually machined with each rotation cycle of the radius end mill 30. The rough processing performed on the bottom face 13 forms a bottom face 18 of the bevel gear forging die 10, this bottom face 18 being yet to undergo final processing.

Figure 8:
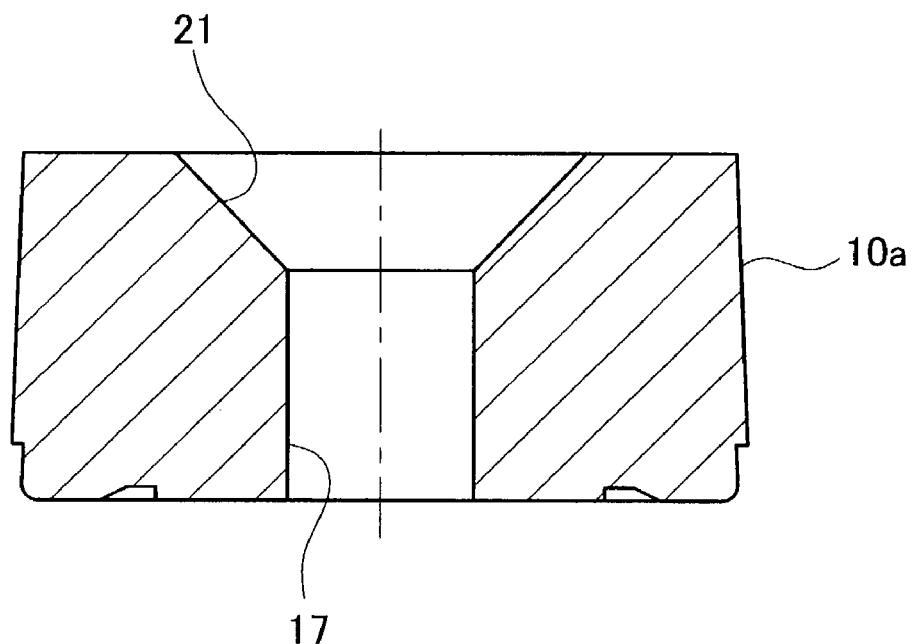
FIG. 8 shows a cross-sectional view of the intermediate material of the present embodiment.
Figure 9:
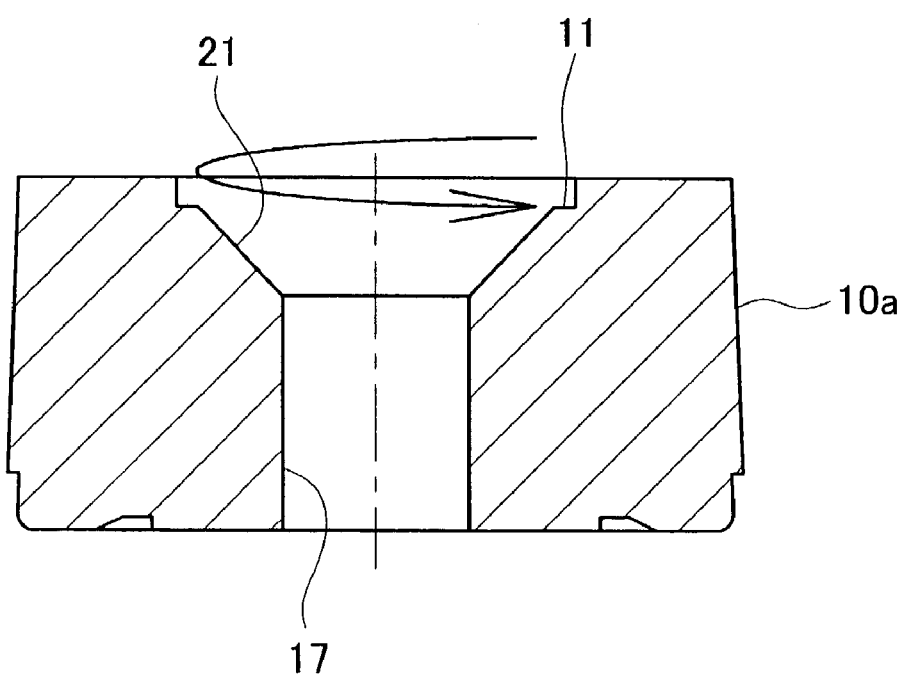
FIG. 9 shows a cross-sectional view of the stepped portions in the intermediate material of the present embodiment in a state of being processed.

Further, as shown in FIG. 9, it is also possible to form the stepped portion 11 with the radius end mill 30 using an intermediate material 10*a*, shown in FIG. 8, that does not have the stepped portion 11 and bottom face 13 formed thereon.

Figure 10:
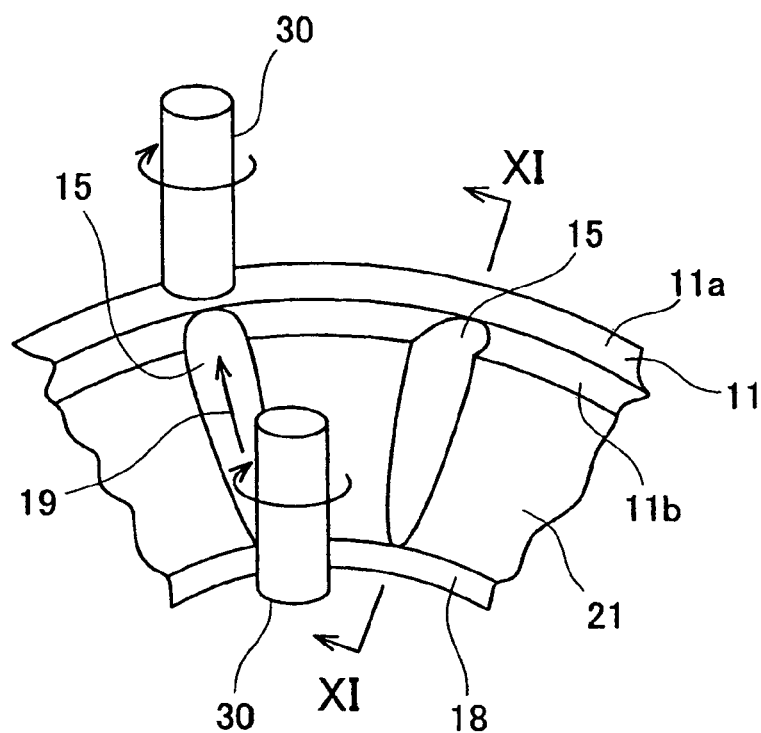
FIG. 10 shows a diagonal view of grooves in a concave cone shaped member of the intermediate material of the present embodiment in a state of being processed.

When the rough processing has been completed at the stepped portion 11 and the bottom face 13 of the intermediate material 10*a*, the rotating radius end mill 30 is deployed simultaneously in the direction perpendicular to its axial direction and in the direction parallel to its axial direction. In a movement parallel to its axis, the radius end mill 30 is pulled in a reward direction as shown by the number 19 in FIG. 10. The radius end mill 30 is not pushed in a forward direction for cutting the intermediate material 10*a*. The deployment of the rotating radius end mill 30 forms grooves 15 in the concave cone shaped member 21 (hereafter, deploying the radius end mill 30 simultaneously in the direction perpendicular to its axial direction and in the direction parallel to its axial direction in the reward direction (diagonal deployment) will be referred to as chip-completion processing). The same radius end mill 30 is used for processing the groove 15 as is used for processing the stepped portion 11 and the bottom face 13. FIG. 10 shows the completed grooves 15. Tooth grooves 14 are formed by further processing the grooves 15; this is described later.

Figure 11:
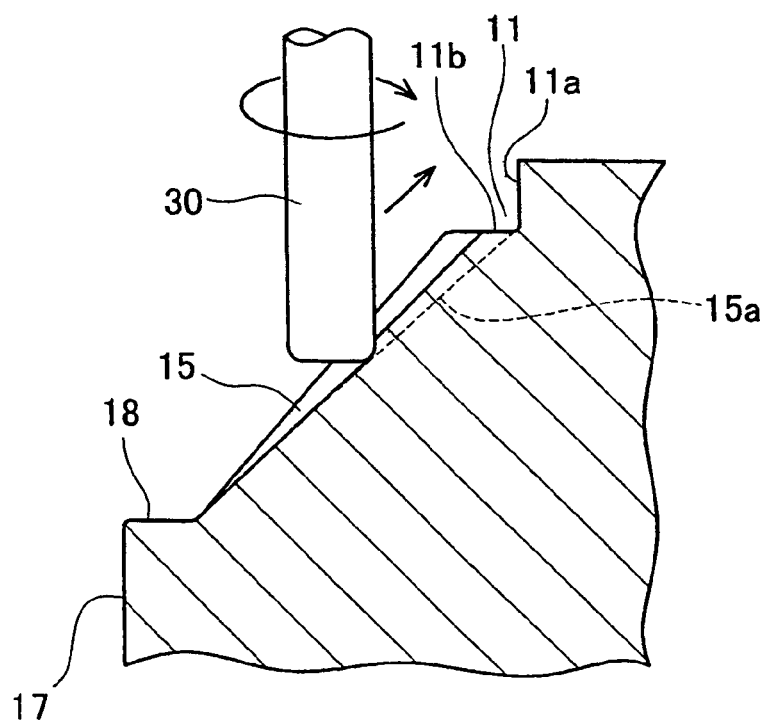
FIG. 11 shows a cross-sectional view of the grooves in the concave cone shaped member of the intermediate material of the present embodiment in a state of being processed.

FIG. 11 shows an intermediate stage in the processing of the grooves 15. The radius end mill 30 repeatedly performs the chip-completion processing, thereby gradually processing the grooves 15. During the course of the chip-completion processing, the radius end mill 30 moves from the bottom face 18, reaches the stepped portion 11, and then is separated from the intermediate material 10*a*. The radius end mill 30 then returns to the bottom face 18, and the chip-completion processing is then repeated. The groove 15 is rough processed up to the depth indicated by the broken line 15*a*. The reason the groove 15 is not machined beyond the outer side of the broken line 15*a* (the right side in FIG. 11) is that the tooth grooves 14 are narrow toward their lower sides, and machining beyond the line 15*a* would cut into the tooth molds 12.

In this manner, by performing chip-completion processing by means of the radius end mill 30, the shape can be broadly machined with a single deployment of the radius end mill 30. After the radius end mill 30 has completed processing one groove 15, the radius end mill 30 processes the neighboring groove 15. By repeatedly processing the grooves 15 in sequence, radially extending grooves 15 can be formed along the entire circumference of the concave cone shaped member 21.

The radius end mill 30 is a tool whose main purpose is to machine raw material by being deployed in a direction perpendicular to its axis. For this reason, the side cutting blades 32*a* of the radius end mill 30 have a high machining ability. Consequently, when the radius end mill 30 is deployed simultaneously in the axial direction and the direction perpendicular to the axial direction, processing is better performed if the side cutting blades 32*a*, rather than the end cutting blades 32c, perform the machining. As a result, when the radius end mill 30 performs the chip-completion processing (simultaneous deployment in the axial reward direction and the direction perpendicular to the axial direction), the grooves 15 can be processed efficiently using the side cutting blades 32a. If the radius end mill 30 is moved simultaneously in the axial forward direction and the direction perpendicular to the axial direction, the end cutting blades 32c, rather than the side cutting blades 32a, perform the machining, and efficiency will be lowered.

Figure 12:
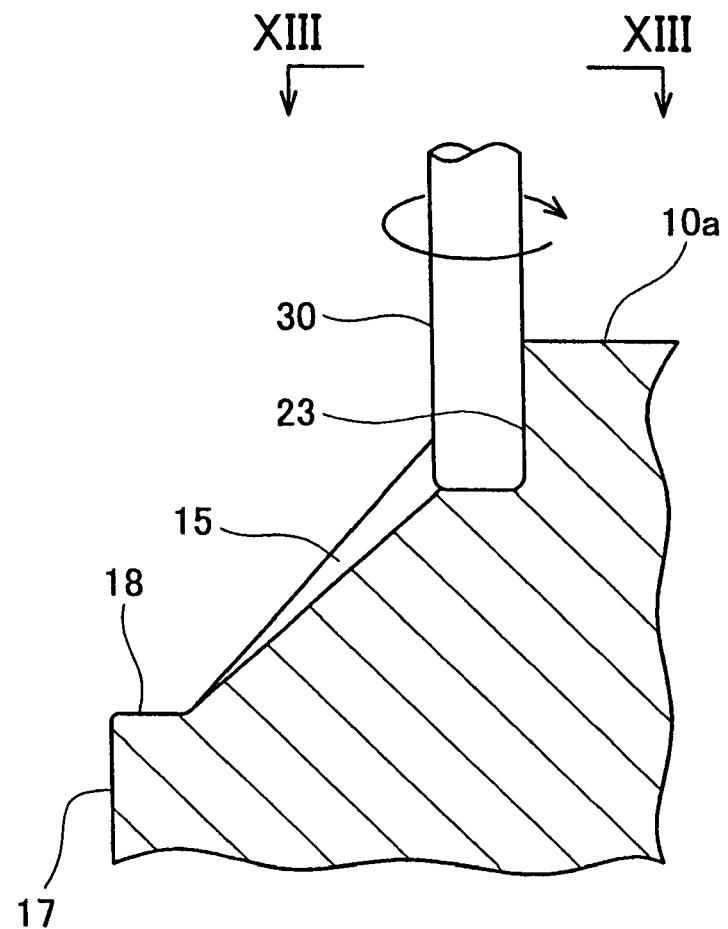
FIG. 12 shows a cross-sectional view of a concave member in the intermediate material of the present embodiment in a state of being processed.

After the grooves 15 have been processed, as shown in FIG. 12, concave members 23 on the upper part of the grooves 15 are rough processed by means of the radius end mill 30. The same radius end mill 30 is used for processing the concave members 23 as was used for processing the stepped portion 11, the bottom face 13, and the grooves 15. In this manner, the same radius end mill 30 can be used even if the shapes to be formed differ, thereby reducing the effort required in replacing the radius end mill 30 with a different end mill.

Figure 13:
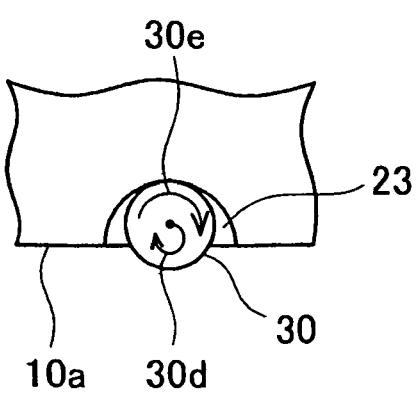
FIG. 13 shows a view along the line XIII—XIII of FIG. 12.
Figure 14:
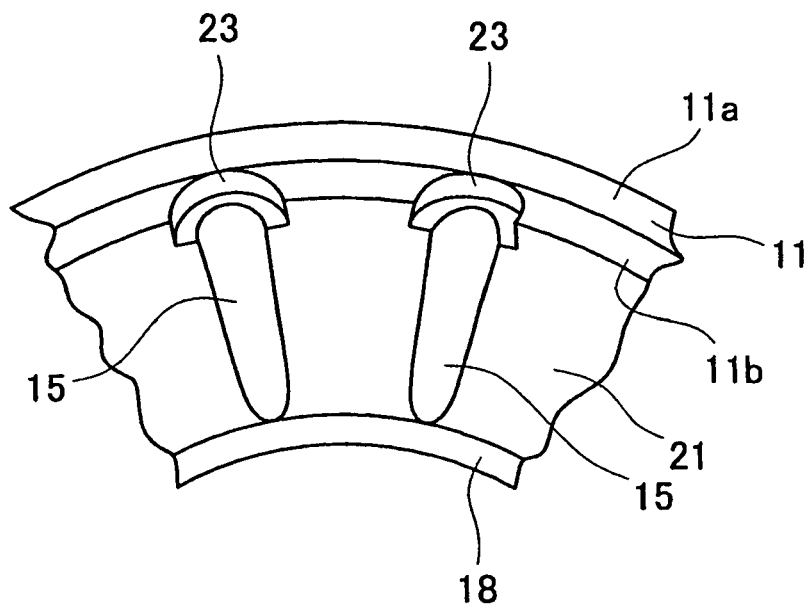
FIG. 14 shows a diagonal view of the concave members in the intermediate material of the present embodiment in a processed state.

As shown in FIG. 13, the radius end mill 30 forms the concave portion 23 while performing tricolloid processing. Tricolloid processing consists of the radius end mill 30 rotating along an axial direction (see the arrow indicated by 30e) while the axis itself rotates (see the arrow indicated by 30d). When the radius end mill 30 performs tricolloid processing, the concave portion 23 can be processed efficiently. FIG. 14 shows the concave portions 23 after they have been processed.

Figure 15:
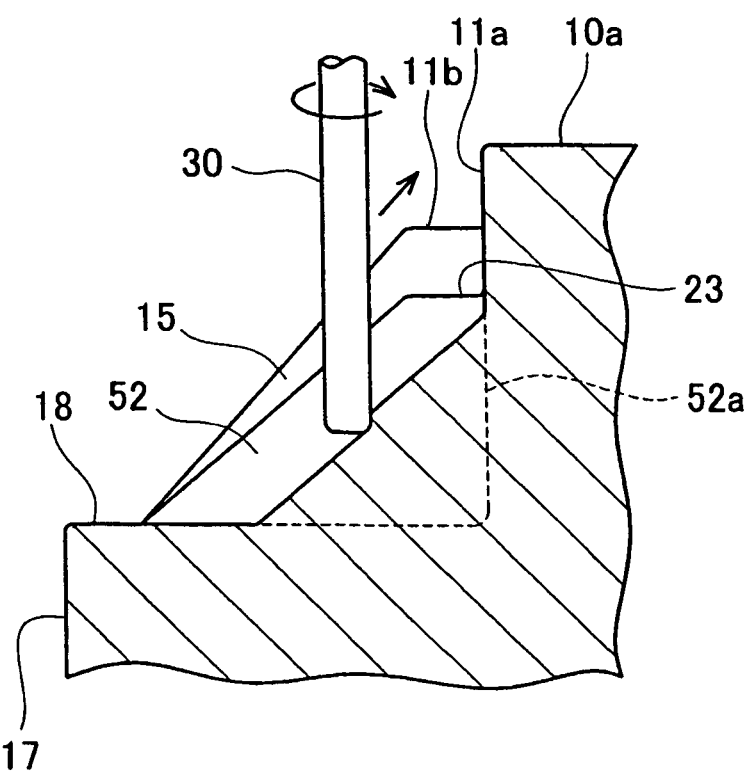
FIG. 15 shows a cross-sectional view of the grooves in the intermediate material of the present embodiment in a state of being processed.
Figure 16:
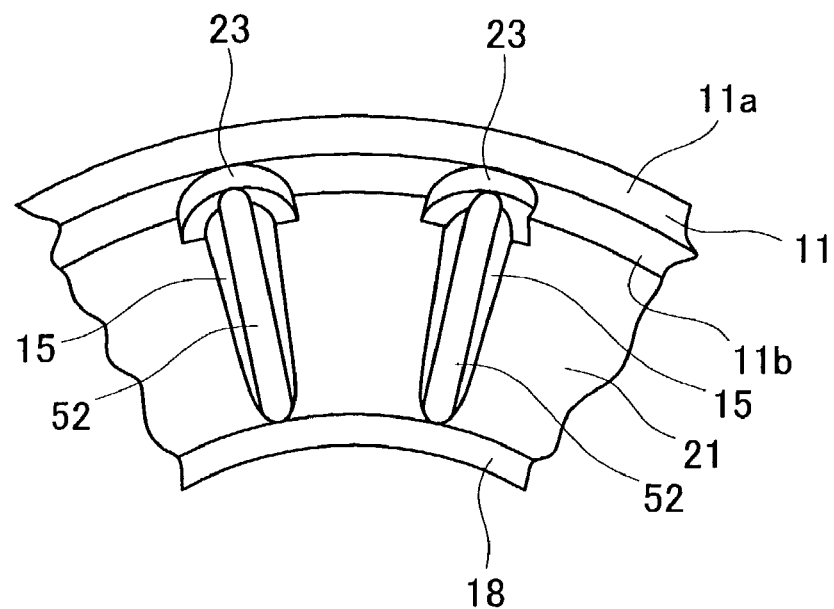
FIG. 16 shows a diagonal view of the grooves in the intermediate material of the present embodiment in a processed state.

After the concave portions 23 are processed, the radius end mill 30 is replaced by a radius end mill 30 with a diameter smaller than that used for processing the stepped portion 11, the bottom face 18, the grooves 15, and the concave portions 23. As shown in FIG. 15, the grooves 52 are formed as the radius end mill 30 repeats chip-completion processing and further cuts into the grooves 15. The grooves 52 are gradually formed as the radius end mill 30 repeats the chip-completion processing. When the radius end mill 30 reaches the concave portion 23, it separates from the intermediate material 10a, returns toward the bottom face 18, and then recommences the chip-completion processing of the grooves 52. The grooves 52 are formed up to the broken line shown by 52a. FIG. 16 shows the completed state of the grooves 52.

Figure 17:
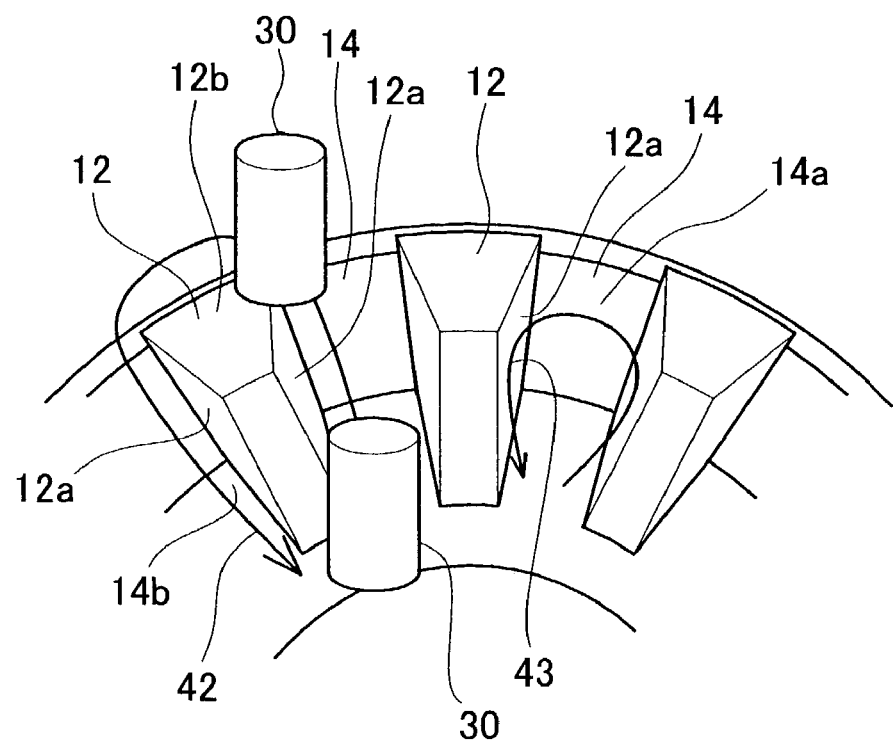
FIG. 17 shows a diagonal view of tooth molds in the intermediate material of the present embodiment in a state of being processed.

Furthermore, as shown in FIG. 17, by deploying the radius end mill 30 in the direction of either the arrow shown by 42 or the arrow shown by 43, the tooth molds 12 and the tooth grooves 14 can be rough processed.

Figure 18:
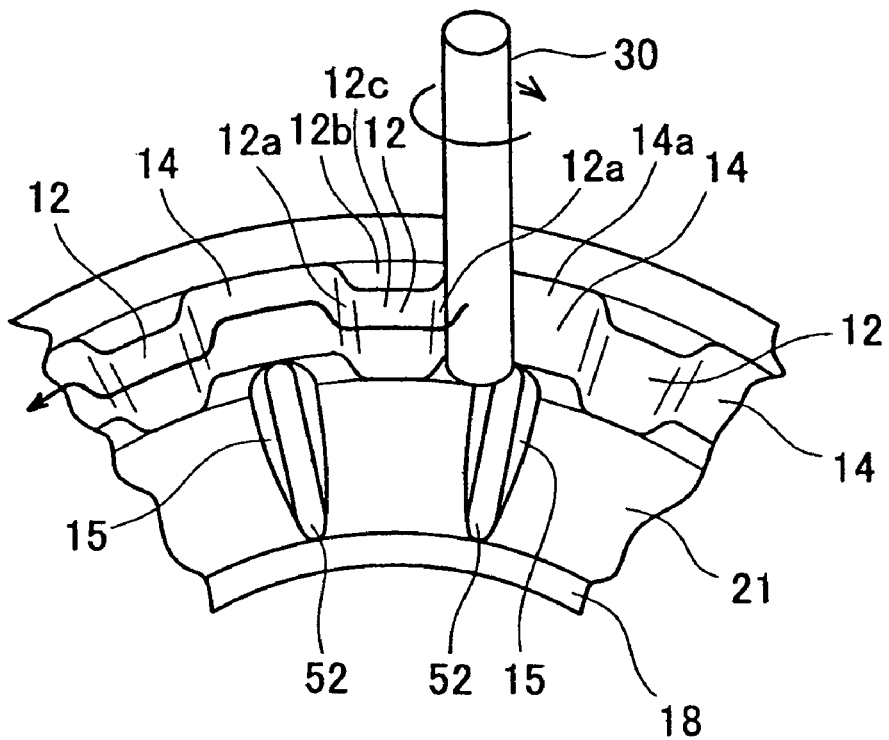
FIG. 18 shows a diagonal view of the tooth molds and tooth grooves in the intermediate material of the present embodiment in a state of being processed.
Figure 19:
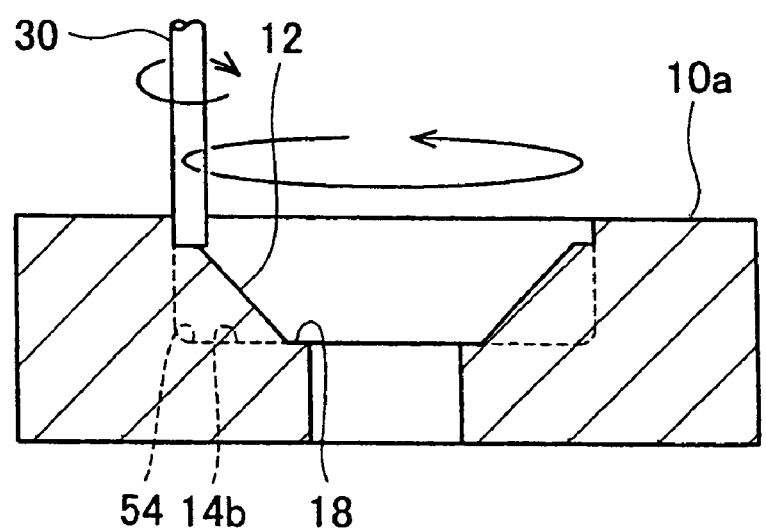
FIG. 19 shows a cross-sectional view of the tooth molds and the tooth grooves in the intermediate material of the present embodiment in a state of being processed.

Next, the same radius end mill 30 as used for processing the grooves 52 is used to rough process the tooth molds 12 and the tooth grooves 14. As shown in FIG. 18 and FIG. 19, the radius end mill 30 is deployed simultaneously in the circumference direction and the diameter direction of the intermediate material 10a, thereby processing the tooth mold side face 12a and the tooth mold face 12c of the tooth molds 12, and the tooth groove anterior faces 14a of the tooth grooves 14. The tooth molds 12 and the tooth grooves 14 are formed by the radius end mill 30 gradually machining towards the outer diameter of the intermediate material 10a.

The present process is started from the upper part of the intermediate material 10a, and machining is performed until it is 50 µm short of that required for the final processing. After machining has been performed until it is short of that required for the final processing, the radius end mill 30 is deployed in a slightly downward direction. The radius end mill 30 then repeatedly machines the tooth molds 12 and the tooth grooves 14 while being deployed in the circumference direction and the diameter direction. When the tooth molds 12 and the tooth grooves 14 have been processed, the lower end face 11b of the stepped portion 11 is cut into, this forming the tooth mold upper faces 12b therein. As shown in FIG. 19, the radius end mill 30 processes the tooth molds 12 and the tooth grooves 14 up to a depth corresponding to the bottom face 18 (that is, up to the broken line 54). Processing the tooth grooves 14 up to a depth corresponding to the bottom face 18 forms the tooth groove bottom face 14b. In this manner, the bevel gear forging die 10 is formed in the shape shown in FIG. 1, this being before final processing is performed.

Figure 20:
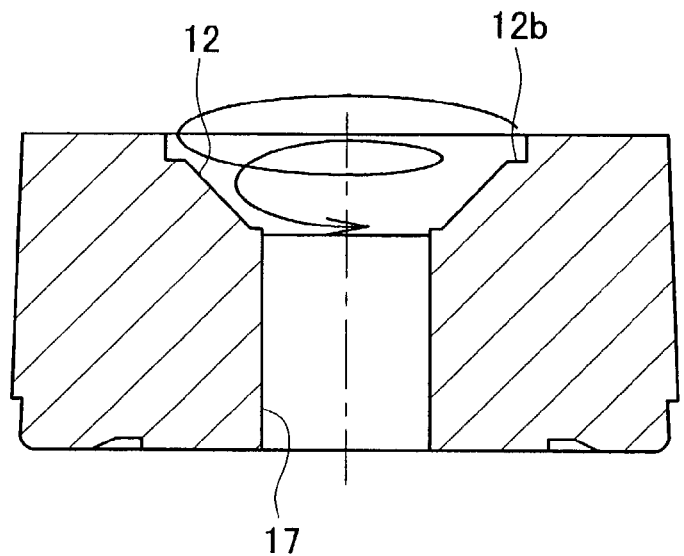
FIG. 20 shows a cross-sectional view of final processing being performed on the bevel gear forging die of the present embodiment.

Next, the final processing is performed. In the final processing, the tooth molds 12 and the tooth grooves 14 etc. molded by means of the rough processing are machined to a depth of 50 µm. As shown in FIG. 20, the radius end mill 30 is used to perform the final processing on the tooth mold upper face 12b. Next, the radius end mill 30 is used to perform the final processing on the tooth molds 12 and the tooth grooves 14. During this process, as in the case of rough processing described with the aid of FIGS. 18 and 19, the radius end mill 30 is deployed simultaneously in the circumference direction and the diameter direction of the intermediate material 10a, and processes the tooth molds 12 and the tooth grooves 14. When the upper portions of the tooth molds 12 and the tooth grooves 14 have been processed up to the given depth, the radius end mill 30 is deployed in a slightly downwards direction, and the tooth molds 12 and the tooth grooves 14 are repeatedly processed further. After the radius end mill 30 has reached the lowest portion, the final processing of the tooth groove bottom face 14b and the bottom face 18 is also completed. If it is necessary to have a small R-shape in the corner common to the two faces, final processing is performed using a bowl end mill having a smaller diameter. The bevel gear forging die 10 is completed by means of the above processes.

Figure 21:
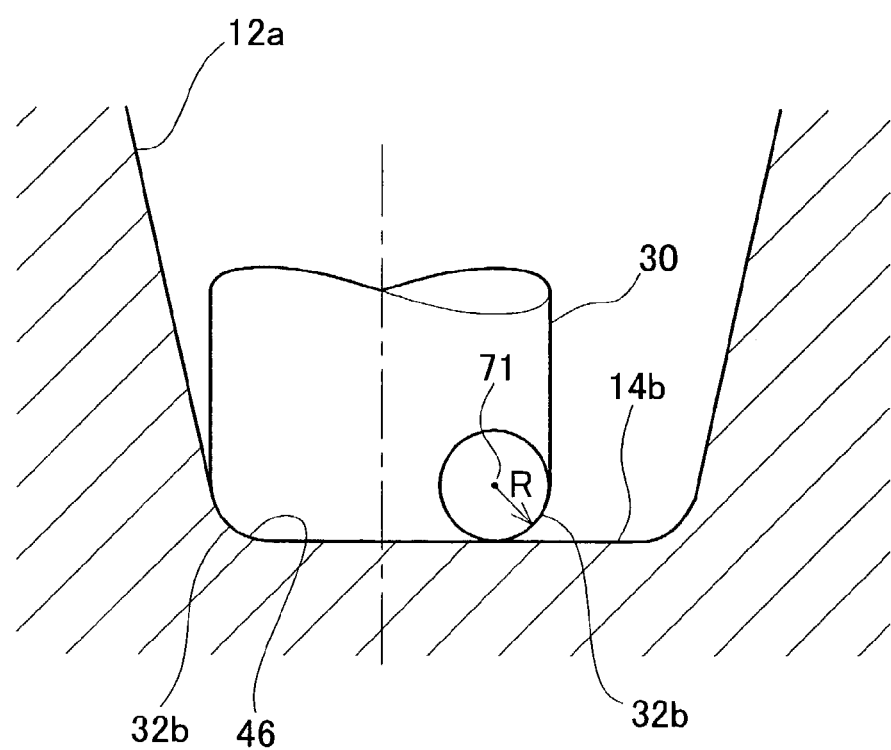
FIG. 21 is a cross-sectional view illustrating details of processing by the radius end mill of the present embodiment.

FIG. 21 shows a corner 46 which connects the tooth mold side face 12a and the tooth groove bottom face 14b, and shows the tooth groove bottom face 14b being processed by the radius end mill 30. During this process, the radius end mill 30 is deployed in a direction perpendicular to the face of the paper on which FIG. 21 is presented. An R-shape having the same shape as the R-shaped cutting blade 32b is formed in the corner 46 by the R-shaped cutting blade 32b of the radius end mill 30. Instead of using the radius end mill 30, such an R-shape can alternatively be created by means of a bowl end mill.

However, the entirety of the cutting blade of the bowl end mill is R-shaped. For this reason, using a bowl end mill to form the corner 46 shape does not allow simultaneous processing of the tooth groove bottom face 14b. Consequently, incomplete machining of the tooth groove bottom face 14b results, and the bowl end mill must be deployed several times in order to process the tooth groove bottom face 14b. Compared to using the radius end mill 30, an excessive number of tools must be used; moreover, adjoining small R-shape is formed on the tooth groove bottom face 14b (the final shape is uneven). Accordingly, using the radius end mill 30 rather than the bowl end mill reduces the number of tools that must be used, and a good quality final shape can be achieved.

When the R-shape of the R-shaped cutting blades 32b of the radius end mill 30 is identical with the R-shape of the bowl end mill, the diameter of the radius end mill 30 can be made larger than that of the bowl end mill. Consequently, the rigidity of the radius end mill 30 in its axial direction is greater than that of the bowl end mill. When the rigidity is greater, the movement of the cutting blades (the recess of the cutting blades) during the machining process is smaller. Consequently, compared to the case where the bowl end mill is used, using the radius end mill 30 allows more precise processing.

Moreover, when the R-shape of the R-shaped cutting blades 32b of the radius end mill 30 is identical with the R-shape of the bowl end mill, since the diameter of the radius end mill 30 can be made larger than that of the bowl end mill, the peripheral speed of the cutting blades (the side cutting blades 32a, the R-shaped cutting blades 32b, and the end cutting blades 32c) of the radius end mill 30 is greater than the bowl end mill. When the moving speed of the cutting blades is greater, a high machining speed can be achieved.

In order to increase the life of the bevel gear forging die 10, the intermediate material 10a to be processed by the radius end mill 30 is one with a high degree of hardness (usually, this is a material with a Rockwell hardness of 60 HRC or greater). As an example of desirable dimensions, when processing a material with a high degree of hardness, the radius of the R-shaped cutting blade 32b can be 0.5 mm, with a tolerance of plus or minus 5 μm, with the tolerance of the central location (number 71 in FIG. 21) of the R-shaped cutting blade 32b being plus or minus 5 μm. By using a radius end mill 30 with such dimensions, material with a high degree of hardness can be processed with high precision. The radius of the R-shaped cutting blade 32b is determined from a fact that the bevel gear forging die 10 has a minimal processing radius of 0.5 mm. In other words, in order to guarantee precision in the bevel gear, if the allowable minimum value of an R-shape (for example, the corner 46) of the bevel gear forging die 10 is kept at 0.5 mm, the value of the radius of the R-shaped cutting blade 32b of the radius end mill 30 is set at an identical value, i.e., 0.5 mm. In this manner, the curvature or radius of the radius end mill 30 is determined on the basis of the allowable processing values of the unprocessed material.

Moreover, by increasing the cross-sectional ratio of the radius end mill 30, it is possible to increase its rigidity along the axial direction thereof, thereby increasing processing accuracy. Here, cross-sectional ratio is defined as the ratio of the segment (measured from the external diameter) that does not have a groove cut into it, to the lateral cross-section of the radius end mill.

Figure 22:
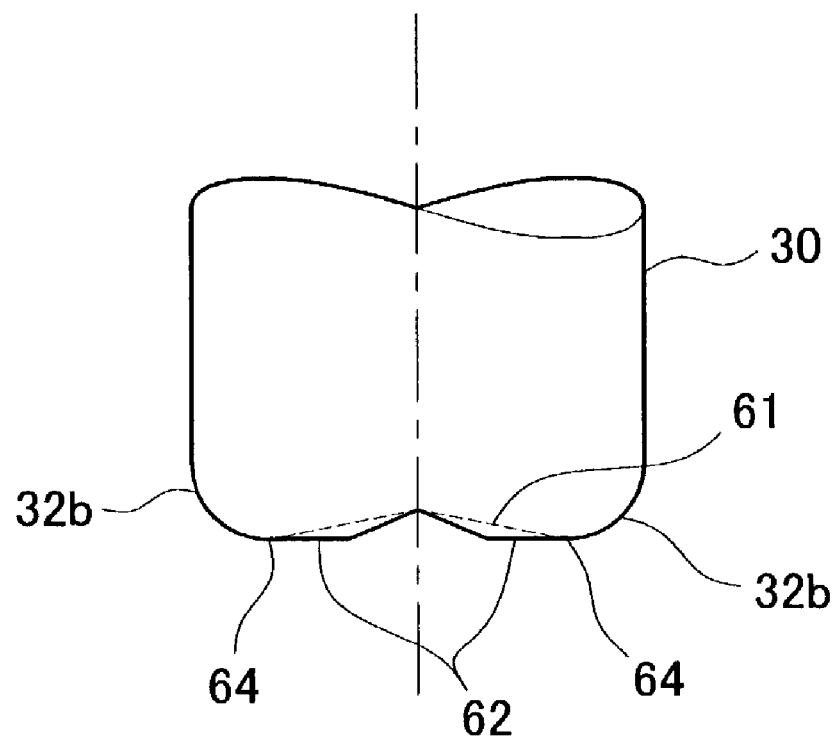
FIG. 22 shows the radius end mill of the present embodiment.

Normally, the anterior end of the cutting blade 32 of the radius end mill 30 has a concave member 61 formed therein, this being shown by the broken line in FIG. 22. When the concave member 61 is provided, end points (R rests) of the R-shaped cutting blades 32b each have an edge (angle) 64 formed thereon. When the edge 64 is formed thereon, an appropriate bottom face machining roughness cannot be achieved. In other words, the edges 64 result in traces of processing remaining on the raw material after the processing has been completed.

In order to prevent this from happening, it is desirable to provide on the end cutting blade 32 a plane portion 62 connected to the R-shaped cutting blades 32b. The plane portion 62 extends along a direction perpendicular to the axial direction of the tool 30. With such a configuration, since the R-shaped cutting blades 32b smoothly connect to the plane portion 62, the edges 64 are not formed. Consequently, an appropriate bottom face machining roughness can be achieved (i.e., the traces of processing can be suppressed). Moreover, providing the plane portion 62 on the radius end mill 30 causes the plane portions 62 to form a plane face perpendicular to the axial direction on the raw material. As a result, the plane portions 62 levels the material while the cutting progresses; this also suppresses the traces of processing.

Figure 23:
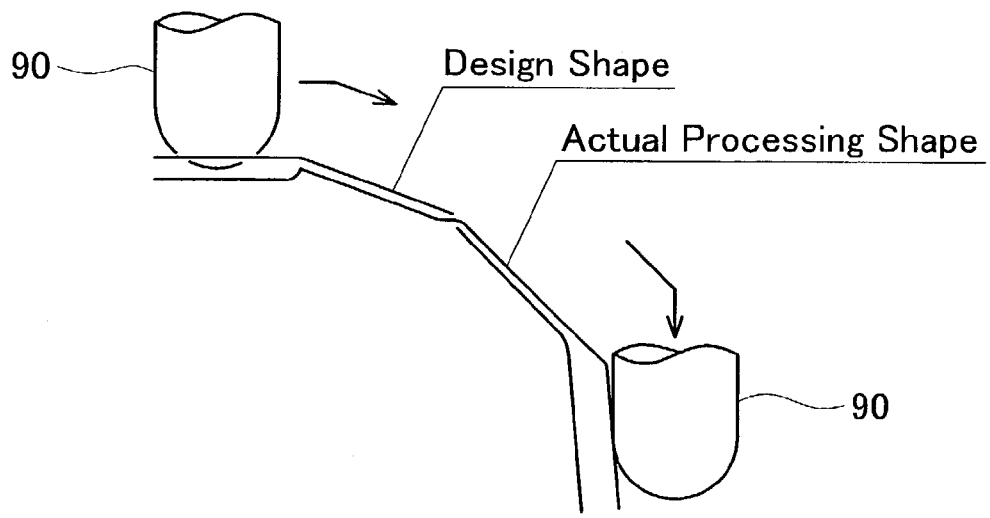
FIG. 23 is a schematic view illustrating processing performed by a bowl end mill.

FIG. 23 shows a schematic view of a design shape (the shape aimed for) and an actual processing shape (the shape that is actually formed as a result of processing) of raw material processed by means of a bowl end mill 90. End cutting blade portions of the bowl end mill 90 have a slow peripheral speed. As a result, as shown on the left side of FIG. 23, if the bowl end mill 90 performs processing by being deployed in a direction perpendicular to its axial direction, the raw material is chipped by the end cutting blades, and the actual processing shape is formed instead of the intended design shape.

When the raw material is processed using the side faces of the cutting blades of the bowl end mill 90 (the right side of FIG. 23), the recess of the cutting blades resulting from the movement of the bowl end mill 90 causes the actual processing shape to be formed instead of the intended design shape.

Figure 24:
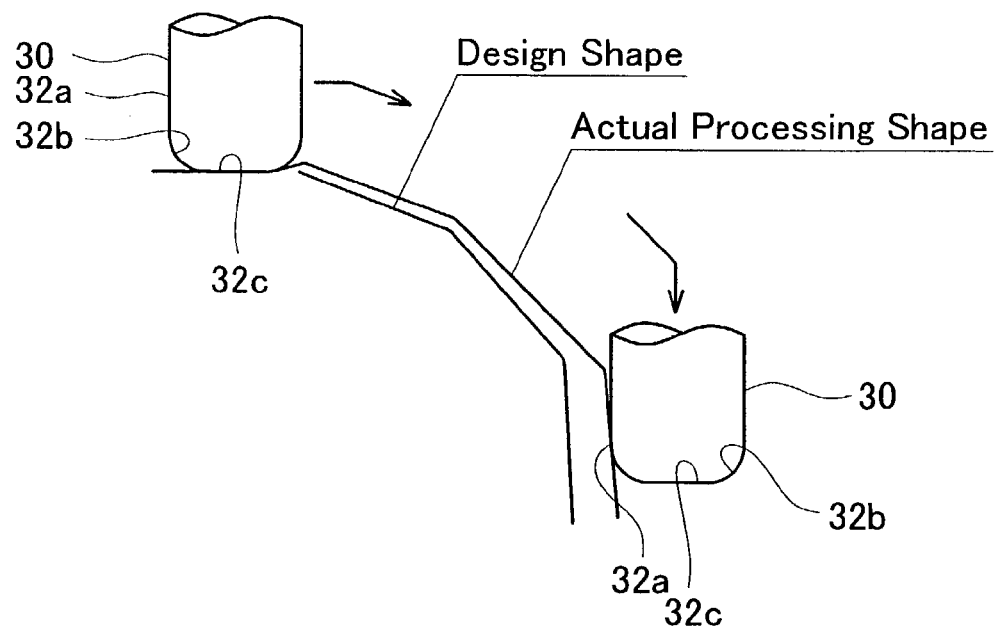
FIG. 24 is a schematic view illustrating processing performed by the radius end mill of the present embodiment.

FIG. 24 shows a schematic view of a design shape (the shape aimed for) and an actual processing shape (the shape that is actually formed as a result of processing) of raw material processed by means of a radius end mill 30. The diameter of the radius end mill 30 is the same as the above-mentioned bowl end mill 90. As shown on the left side of FIG. 24, when the radius end mill 30 performs processing by being deployed in a direction perpendicular to its axial direction, the radius end mill 30, unlike the bowl end mill 90, performs the machining by means of the R-shaped blades 32b and the end cutting blades 32c, these having a fast peripheral speed. As a consequence, unlike the case with the bowl end mill 90, the material does not get chipped, and the actual processing shape corresponds to the intended design shape.

When the radius end mill 30 is deployed in its axial direction and the raw material is processed by means of the side cutting blades 32a (the right side of FIG. 24), the recess of the cutting blades resulting from the movement of the radius end mill 30 causes the actual processing shape to be different from the intended design shape.

Consequently, when the position of bowl end mill 90 relative to the raw material is to be corrected so as to account for the difference between the actual processing shape and the intended design shape, both the chipping of the raw material due to the end cutting blades and the movement of the blades must be taken into account. By contrast, using the radius end mill 30 requires only that the recess of the blades is taken into account. As a result, using the radius end mill 30 rather than the bowl end mill 90 allows the NC construction device to store a simpler program relating to the process. As described earlier, a radius of the radius end mill and a radius of the bowl end mill is probably the same in the cases where the corner R member has the same radius. If a thick radius end mill is used, the movement of the cutting blade is small, and this further simplifies the program which sets the tool path.

A specific example of an embodiment of the present invention is presented above, but this merely illustrates some possibilities of the invention and does not restrict the claims thereof. The art set forth in the claims includes variations, transformations and modifications to the specific example set forth above. Furthermore, the technical elements disclosed in the present specification or figures may be utilized separately or in all types of conjunctions and are not limited to the conjunctions set forth in the claims at the time of submission of the application. Furthermore, the art disclosed in the present specification or figures may be utilized to simultaneously realize a plurality of aims or to realize one of these aims.

What is claimed is:

1. A method for manufacturing a bevel gear forging die, comprising:
    a step of cutting raw material to form an inner side face of the bevel gear forging die by using a side cutting blade of a radius end mill;
    a step of cutting raw material to form an inner bottom face of the bevel gear forging die by using an end cutting blade of the radius end mill; and
    a step of cutting raw material to form an inner diagonal face of the bevel gear forging die by using the side cutting blade and a R-shaped cutting blade of the radius end mill.

2. A method for manufacturing a bevel gear forging die as set forth in claim 1, wherein the inner diagonal face of the bevel gear forging die is formed by moving the radius end mill diagonally with respect to the axis of the radius end mill.

3. A method for manufacturing a bevel gear forging die as set forth in claim 1, wherein the inner diagonal face of the bevel gear forging die is formed by moving the radius end mill diagonally in the reward direction with respect to the axis of the radius end mill.

4. A method for manufacturing a bevel gear forging die as set forth in claim 3, wherein the radius of the R-shaped cutting blades corresponds to the minimum radius of an R-shape to be formed at a corner between two faces of the bevel gear forging die.

5. A method for manufacturing a bevel gear forging die as set forth in claim 4, wherein at least a portion of the end cutting blades of the radius end mill extends along a direction perpendicular to the axis of the radius end mill.

6. A method for manufacturing a bevel gear forging die as set forth in claim 1, wherein said R-shaped cutting blade has a radius determined on a basis of an allowable processing value of the bevel gear forging die.

7. A method for manufacturing a bevel gear forging die as set forth in claim 6, wherein the end cutting blade and the R-shaped cutting blade join together in an edge-free transition.

8. A method for manufacturing a bevel gear forging die, comprising:
    a step of cutting raw material to form an inner side face of the bevel gear forging die by using a side cutting blade of a radius end mill;
    a step of cutting raw material to form an R-shape at a corner between two faces of the bevel gear forging die by using an R-shaped cutting blade of the radius end mill; and
    a step of cutting raw material to form an inner diagonal face of the bevel gear forging die by using the side cutting blade and the R-shaped cutting blade of the radius end mill.

* * * * *